Nov. 20, 1934.    W. H. PAVITT    1,981,188
VEHICLE POSITION INDICATOR
Filed April 5, 1932    2 Sheets-Sheet 1
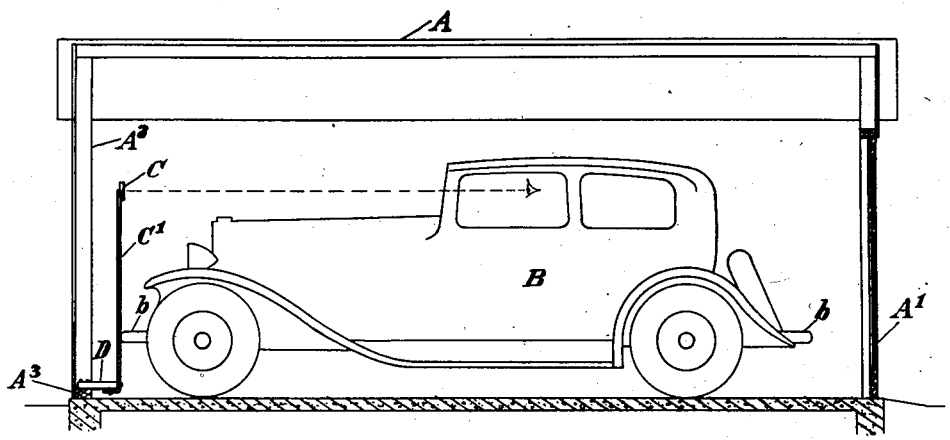
Fig. 1,
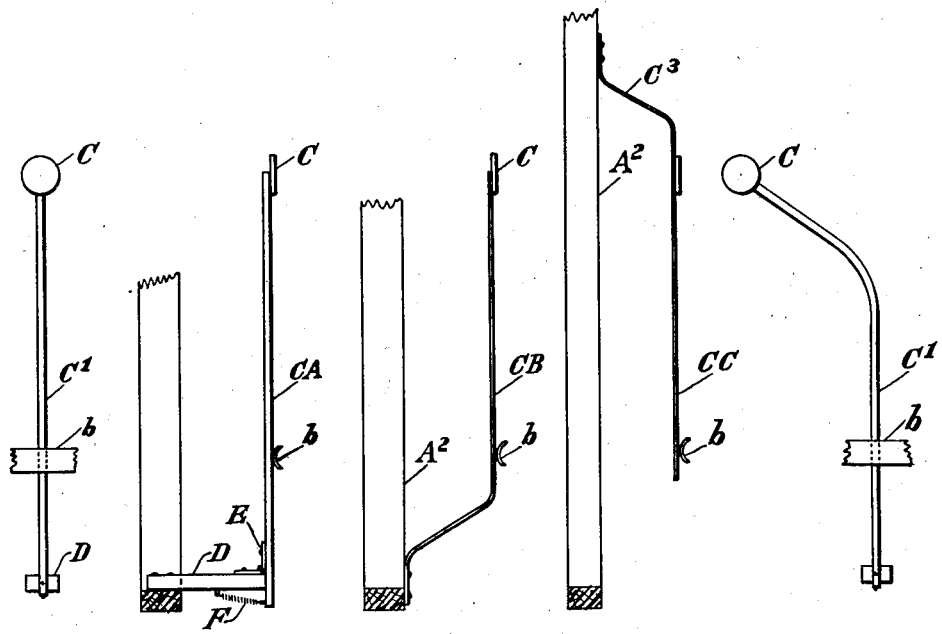
Fig. 2,    Fig. 3,    Fig. 4,    Fig. 5,    Fig. 6,
WILLIAM H. PAVITT
INVENTOR
BY John E. Hubbell
ATTORNEY Nov. 20, 1934.  W. H. PAVITT  1,981,188
VEHICLE POSITION INDICATOR
Filed April 5, 1932   2 Sheets-Sheet 2
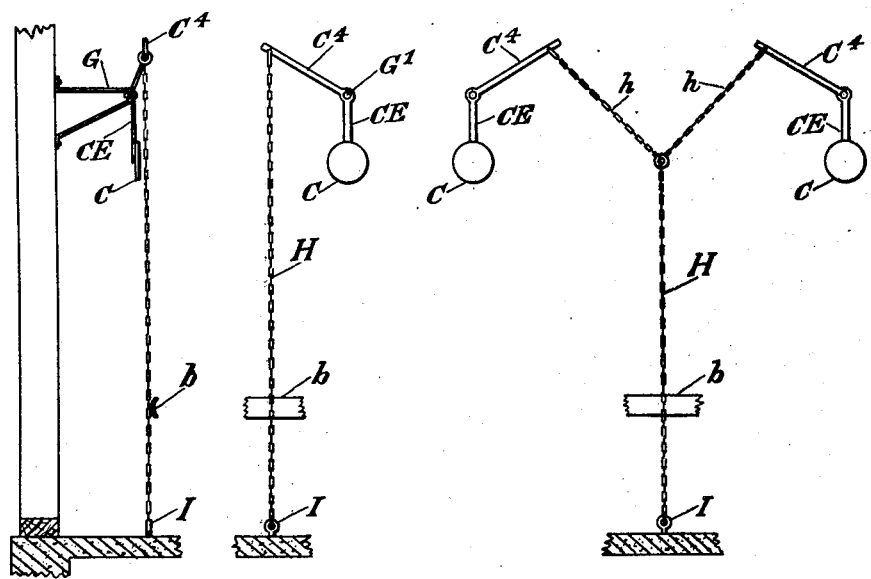
Fig. 7,   Fig. 8,   Fig. 9,
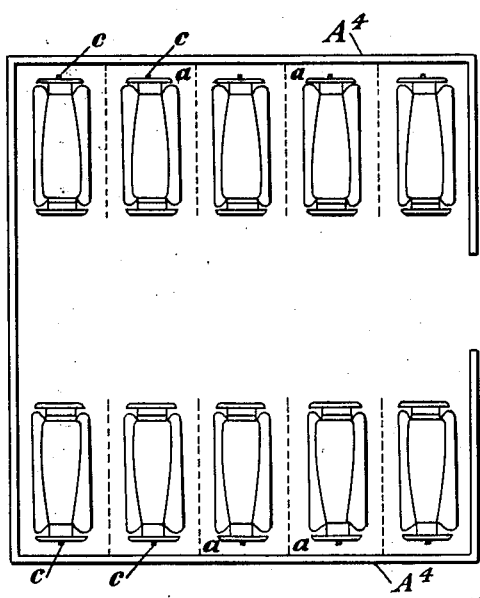
Fig. 10,
WILLIAM H. PAVITT
INVENTOR
BY *John E. Hubbell*
ATTORNEY Patented Nov. 20, 1934

1,981,188

UNITED STATES PATENT OFFICE 1,981,188

VEHICLE POSITION INDICATOR

William H. Pavitt, Bronxville, N. Y.

Application April 5, 1932, Serial No. 603,346

1 Claim. (Cl. 116—28)

The general object of the present invention is the provision in a garage, parking space or other automobile receiving space or station, of indicating or signalling means automatically engaged by the automobile, as the latter approaches a boundary of said space beyond which the automobile should not pass, to thereby indicate to the driver of the automobile the position of the automobile relative to said boundary.

As those familiar with the operation of automobiles are well aware, damage to garage walls and to automobiles and their equipment frequently results from the failure of the driver of the automobile to arrest the motion of the latter at the proper time, as the automobile is being moved into a restricted receiving space. Under such restricted space conditions as frequently are found in small individual garages, or as exist in the case of public and private garages and parking stations in which a plurality of cars are closely spaced more than ordinary skill and judgment of clearances on the part of the driver is required to avoid occasional injurious impact of the entering car with the walls of the garage or other stationary barriers or with other cars, particularly as unsatisfactory conditions in respect to visibility are not unusual. The difficulties and risks of injury from the above mentioned causes are especially pronounced with the low seats and high cowls found in certain modern types of automobiles in general use.

In accordance with the present invention I provide the automobile receiving space with suitable indicating means for actuation by an entering automobile as it approaches the desired boundary or safe limit of its movement in said space, to thereby indicate to the driver the precise position of the automobile relative to said boundary. As will be apparent the indicating provisions may vary widely in form and disposition. In general, however, I prefer to employ visual indicator means comprising an indicator target or the like having a simple actuating part for engagement by the automobile, the target or analogous indicator being in such position as to be readily observed by the driver of the automobile, either directly or through the mirror or mirrors ordinarily provided in automobiles to increase the driver's effective range of vision. Preferably, I so arrange and dispose the indicator actuating means that the latter will be engaged and actuated by the bumper now customarily provided at one end and usually at both ends of an automobile.

The various features of novelty which characterize my invention are pointed out with particularity in the claim annexed to and forming a part of this specification. For a better understanding of the invention, however, and the advantages possessed by it reference should be had to the accompanying drawings and descriptive matter in which I have illustrated and described a preferred embodiment of the invention.

Of the drawings:

Fig. 1 is a sectional elevation of a garage equipped with the present invention;

Fig. 2 is an elevation of the indicating means taken at right angles to Fig. 1;

Figs. 3, 4 and 5 are partial elevations taken similarly to Fig. 1, and each illustrating a different modification of the indicating means;

Fig. 6 is a view taken similar to Fig. 2 illustrating a further modification;

Figs. 7 and 8 are elevations at right angles to one another illustrating still another form of indicating apparatus;

Fig. 9 is an elevation taken similarly to Fig. 7 illustrating a modified form of indicating means of the type shown in Figs. 7 and 8; and Fig. 10 is a diagrammatic plan view of a public or multi-automobile garage equipped with automobile position indicating means.

In the simple embodiment of the invention illustrated in Figs. 1 and 2, A represents a typical garage structure of the relatively small and inexpensive single car type, in which, when occupied by an automobile B, there is little clearance between the automobile and the entrance door A' and the back wall A² of the garage. The garage A is provided with indicating means comprising an indicator or target C carried at the upper end of a vertically disposed flexible metal bar C'. The latter is anchored at its lower end to the garage structure and is in position to be engaged by the front bumper b of the automobile B, when the front end of the automobile entering the garage approaches as closely as is desirable to the rear wall A² of the garage. The indicator or target C is located at a level above that of the hood of the automobile in position to be plainly visible by the occupant of the driver's seat of the automobile when the latter is in position to actuate the indicator.

With the arrangement shown in Figs. 1 and 2, when the automobile is backed into the garage A, the flexible indicator standard C' is engaged and deflected, and thereby gives movement to the indicator C by the rear bumper b of the automobile. While from the actuating standpoint it is generally desirable that the flexible indicator actuating member C' should be disposed in or near the longitudinal center line of the space normally occupied by the automobile, in some cases the indicator itself may advantageously be located at the side of the position normally occupied by the car so as to make the indicator more readily visible to the driver through the usual automobile mirror in front of him when the automobile is backed into the receiving space. This result may be secured in various ways, for example, by bending the upper portion of the indicator standard C' as shown in Fig. 6, so that the indicator is at the driver's side of the automobile when the latter is backed into the receiving space.

In Figs. 1 and 2, the indicator standard is shown as a plain flexible steel bar having its lower end transversely bent, and, as shown, is anchored in place by a nail passing horizontally through the vertical portion of the bar into the end, and by a nail passing upward through the transversely bent lower portion of the bar into the underside of a wooden block or bracket member D projecting horizontally away from the rear wall $A^2$ of the garage a few inches above the floor wall level. The member D is shown as secured to the garage structure by having its end remote from the standard C' nailed to a sill $A^3$ forming a part of the garage rear wall $A^2$.

In indicator means of the general type shown in Figs. 1 and 2, the indicator standard need not be made flexible, but may be connected to the bracket D or other support by a hinge E shown in Fig. 3 as connecting a rigid indicator support CA to the post D. In Fig. 3 a tension helical spring F is shown as connected at one end to the bracket D and at its other end to the lower end of the standard CA, so that the spring normally holds the standard CA vertical, but yields to permit the latter to turn about its hinge joint when engaged by an automobile bumper b.

Instead of being anchored to a bracket D the indicator standard may be bent as is the standard CB of Fig. 4, so that the lower end of the standard may be secured directly to the rear wall $A^2$ adjacent the bottom of the latter as shown in Fig. 4.

Instead of anchoring the indicating means to the floor or rear wall, it may be anchored above the body of the car, for example, as shown in Fig. 5, the standard support CC may have an upper offset portion $C^3$ secured at its upper end against an upper portion of the rear wall $A^2$. In Fig. 5 the indicator C is connected to the support CC intermediate the ends of the latter, the lower end of the support extending downward into position for engagement by the bumper b.

In the arrangement shown in Figs. 7 and 8, the indicator C is carried by a bell crank lever CE pivoted on a pivot pin G' parallel to the axis of the receiving space and shown as carried by a bracket G adapted to be secured to the garage roof or other overhead supporting structure. The indicator C of Figs. 7 and 8 and the arm $C^4$ of the lever CE carrying it are made heavy enough so that said arm and the indicator C normally hang down directly below the pivotal support G'. The second arm $C^4$ of the lever CE is connected by a rope, chain or analogous flexible element H to an anchor member I. The latter may be, and as shown is an eye-bolt, the shank of which may extend into and be secured in the floor of the garage or parking space. The flexible element H is normally held taut in the position shown in Fig. 8 by the weight of the indicator C and arm $C^4$ when not engaged by the automobile bumper b. When the element H is engaged and deflected by the bumper b, however, the indicator C is turned about the pivot G' in the counter-clockwise direction, as seen in Fig. 8.

The arrangement shown in Fig. 9 differs from that shown in Figs. 7 and 8 in that the flexible actuating element H gives motion to two levers CE, each of which may be individually similar in structure and in its mounting to the lever CE of Figs. 7 and 8. In Fig. 9, however, the two levers CE face in opposite directions and are displaced in opposite directions from the center line of the corresponding automobile receiving space so that when actuated one indicator C can be readily seen at one side of the automobile, and the other at the opposite side of the automobile. To permit the simultaneous actuation of the levers CE by the same flexible actuating element H, the upper end of the latter is connected, as shown in Fig. 9, to the arms $C^4$ of the two levers CE by individual oppositely inclined links h. In effect the links h form bifurcated portions of the upper end of the element H, and may be rigid bars or chain or rope sections.

Fig. 10 illustrates a typical public or multi-car garage or parking space comprising a row of side by side automobile receiving stalls or spaces a, one along each of the side walls $A^4$ of the garage. Each of said stalls or receiving spaces a is provided with a corresponding indicator C which may be arranged and actuated in any of the ways previously described, or in any other suitable manner.

While in accordance with the provisions of the statutes, I have illustrated and described preferred embodiments of the present invention, those skilled in the art will understand that many variations in the form of the apparatus disclosed herein may be made without departing from the spirit of the present invention, and that certain features of the invention may sometimes be used to advantage without a corresponding use of other features.

Having now described my invention what I claim as new and desire to secure by Letters Patent, is:

The combination with an automobile storage space, of means for indicating the position of an automobile relative to the boundary of said space, comprising a vertically disposed flexible element, means for anchoring the lower end of said element in fixed position relative to said space, said element having a portion intermediate its ends in position for engagement by the bumper of an automobile entering said space and reaching the desired limit of its movement of approach to said boundary, and a target which is located within the normal range of vision of the driver of the automobile when the latter is in position to engage said element and is moved by the deflection of said element produced by said engagement.

WILLIAM H. PAVITT.